US009112832B1

(12) United States Patent
Valdetaro

(10) Patent No.: US 9,112,832 B1
(45) Date of Patent: Aug. 18, 2015

(54) SYSTEM AND METHOD FOR RUNNING A WEB SERVER ON A MOBILE INTERNET DEVICE

(75) Inventor: Luiz Claudio Valdetaro, Coppell, TX (US)

(73) Assignee: Vertical Computer Systems, Inc., Richardson, TX (US)

( * ) Notice: Subject to any disclaimer, the term of this patent is extended or adjusted under 35 U.S.C. 154(b) by 0 days.

(21) Appl. No.: 12/966,741

(22) Filed: Dec. 13, 2010

(51) Int. Cl.
*G06F 15/16* (2006.01)
*H04L 29/08* (2006.01)

(52) U.S. Cl.
CPC ...................................... *H04L 67/04* (2013.01)

(58) Field of Classification Search
None
See application file for complete search history.

(56) References Cited

U.S. PATENT DOCUMENTS

| | | | |
|---|---|---|---|
| 6,647,001 B1 | 11/2003 | Bhagavath | |
| 6,766,349 B1 * | 7/2004 | Belkin | 718/104 |
| 6,993,569 B1 * | 1/2006 | Rees, Jr. | 709/217 |
| 7,039,708 B1 * | 5/2006 | Knobl et al. | 709/227 |
| 7,334,126 B1 | 2/2008 | Gilmore et al. | |
| 8,024,227 B2 | 9/2011 | Howard et al. | |
| 8,116,808 B2 * | 2/2012 | Amine | 455/550.1 |
| 8,254,896 B2 | 8/2012 | Lazaridis | |
| 2002/0116638 A1 | 8/2002 | Dobes et al. | |
| 2003/0191970 A1 * | 10/2003 | Devine et al. | 713/201 |
| 2004/0179537 A1 | 9/2004 | Boyd et al. | |
| 2006/0031929 A1 | 2/2006 | Saito | |
| 2007/0022164 A1 | 1/2007 | Nog et al. | |
| 2007/0203970 A1 | 8/2007 | Nguyen | |
| 2008/0028078 A1 | 1/2008 | Saiki et al. | |
| 2008/0148286 A1 | 6/2008 | Hetrick | |
| 2008/0172449 A1 * | 7/2008 | Bengtsson et al. | 709/203 |
| 2009/0258634 A1 * | 10/2009 | Amine | 455/413 |
| 2010/0131583 A1 | 5/2010 | Lee et al. | |
| 2010/0293564 A1 | 11/2010 | Gould et al. | |
| 2011/0119600 A1 * | 5/2011 | Liu et al. | 715/760 |
| 2012/0144475 A1 | 6/2012 | Boire-Lavigne et al. | |
| 2013/0138836 A1 | 5/2013 | Cohen et al. | |

FOREIGN PATENT DOCUMENTS

WO       2002/067540 A1      8/2002

OTHER PUBLICATIONS

Zimmerly, Bill; A Tiny Cloud in Android: Exploring the Android file system from your browser, Internet article, Nov. 17, 2009, pp. 1-12, XP002673823, http://www.ibm.com/developerworks/opensource/library/os-tinycloud/index.htm.

(Continued)

*Primary Examiner* — John B Walsh
(74) *Attorney, Agent, or Firm* — Jack D. Stone, Jr., Esq.; Scheef & Stone, L.L.P.

(57) ABSTRACT

A mobile Internet device (MID) having an operating system, a user interface framework, and telephony functionality. A web server is integrated into the operating system and configured for servicing HTTP requests. Telephony functionality is operable by said OS. Multiple such MID's are configurable as a peer-to-peer network, or peer-to-peer social network.

25 Claims, 1 Drawing Sheet

(56) References Cited

OTHER PUBLICATIONS

Henderson, Thomas R., "Host Mobility for IP Networks: A Comparison", IEEE Network, Nov./Dec. 2003, pp. 18-26, vol. 17, No. 6, IEEE Service Center, New York, NY, US.

Wikman, Johan and Dosa, Ferenc, "Providing HTTP Access to Web Servers Running on Mobile Phones", Nokia Research Center Helsinki, http://research.nokia.com, NRC-TR-2006-005, May 24, 2006, 6 pp., XP-002435345.

* cited by examiner

SYSTEM AND METHOD FOR RUNNING A WEB SERVER ON A MOBILE INTERNET DEVICE

COMPUTER PROGRAM LISTING APPENDIX

A Computer Program Listing Appendix, containing a computer program listing, constitute a part of the specification of this invention pursuant to 37 C.F.R. 1.77 and 1.96 and "Legal Framework For EFS-WEB (20 May 10)", and is incorporated by reference herein for all purposes. The Appendix includes a single file named TinyWebServer.txt, created on Dec. 9, 2010, and contains 50.9 kilobytes (actual size of the file is 52,192 bytes). TinyWebServer.txt represents substantially only relevant pieces of a web server, excludes code that is unrelated to the invention, and all commands that are operating-system-specific have been modified to a more "generic" call.

TECHNICAL FIELD

The invention relates generally to mobile Internet devices and webservers and, more particularly, to a system and method for running a web server on a mobile Internet device.

SUMMARY

The present invention, accordingly, provides a mobile Internet device (MID) having an operating system, a user interface framework, and telephony functionality. A web server is integrated into the operating system and configured for servicing HTTP requests. Telephony functionality is operable by said OS. Multiple such MID's are configurable as a peer-to-peer network, such as a peer-to-peer social network.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
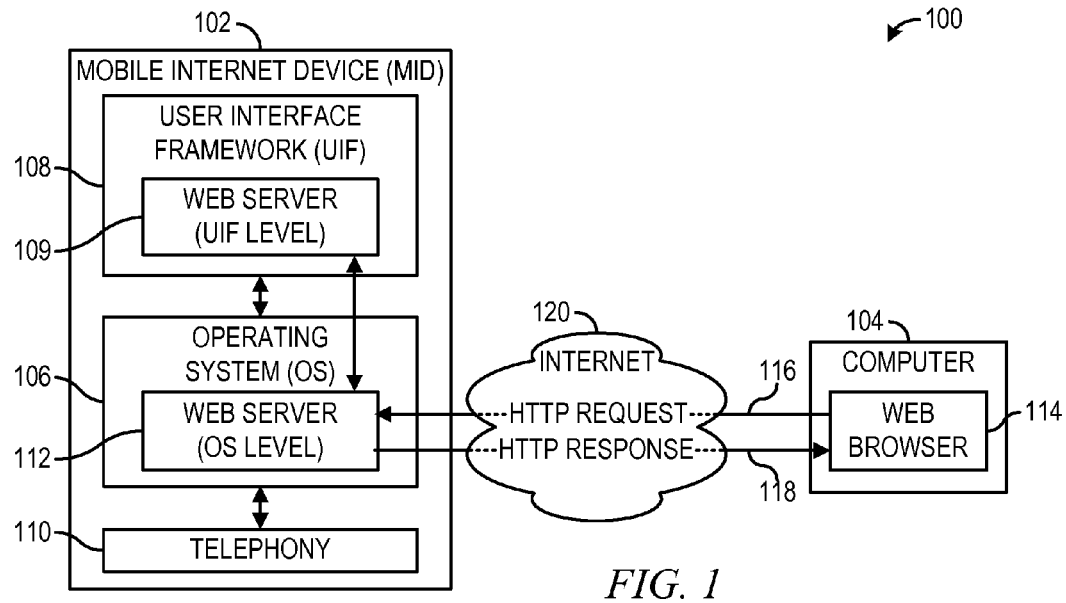
FIG. 1 is a block diagram of a mobile Internet device in communication with a web browser in accordance with principles of the present invention.

In the discussion of the FIGURES, the same reference numerals will be used throughout to refer to the same or similar components, and numerous specific details are set forth to provide a thorough understanding of the present invention. However, it will be obvious to those skilled in the art that the present invention may be practiced without such specific details. In other instances, well-known elements have been illustrated in schematic or block diagram form in order not to obscure the present invention in unnecessary detail. Additionally, for the most part, details concerning hyper-text transfer protocol (HTTP), mobile Internet devices, web servers, and the like have been omitted inasmuch as such details are not considered necessary to obtain a complete understanding of the present invention, and are considered to be within the skills of persons of ordinary skill in the relevant art. HTTP is considered to include HTTPS and related protocols.

It is noted that, unless indicated otherwise, all functions described herein may be performed by a processor such as a microprocessor, a controller, a microcontroller, an application-specific integrated circuit (ASIC), an electronic data processor, a computer, or the like, in accordance with code, such as program code, software, integrated circuits, and/or the like that are coded to perform such functions. Furthermore, it is considered that the design, development, and implementation details of all such code would be apparent to a person having ordinary skill in the art based upon a review of the present description of the invention.

Referring to FIG. 1 of the drawings, the reference numeral 100 generally designates a system of communication between a mobile Internet device (MID) 102 and a computer 104. The MID 102 includes an operating system (OS) 106 coupled to a user interface framework (UIF) 108 and telephony functionality 110 or, alternatively, telephony computer program code adaptable to perform as telephony functionality when coupled with suitable hardware (e.g., a microphone) well known in the art. The OS 106 includes a web server 112, preferably very small in size to avoid taking resources form other critical applications on the MID while still remaining operational, exemplified by the web server code written in C presented in the Computer Program Listing Appendix, incorporated by reference herein. The web server may alternatively reside, in part 109, outside the OS 106 (within the UIF 108), and in part 112 within the OS 106, the part within the OS preferably being effective for at least servicing HTTP requests. The computer 104 includes a web browser 114 configured for HTTP communication with the web server 112 on the MID 102. More specifically, the web browser 114 is effective for sending HTTP Request messages to the web server 112, and for receiving HTTP Response messages from the web server 112. Correspondingly, the web server 112 is effective for receiving HTTP Request messages from the web browser 114; and in response thereto for generating HTTP Response messages to the web browser 114. Communication of the HTTP messages is preferably effected through a communication network, such as the Internet 120, a wireless cellular network (not shown), or the like, or a combination thereof. As may be appreciated, the MID 102 includes a number of components, including many not depicted or discussed herein, but which are considered to be well-known in the art and will, therefore, not be discussed in further detail herein, except insofar as necessary to describe the present invention.

The telephony functionality 110 provides the MID 102 with functionality preferably enabling the MID 102 to communicate wirelessly using conventional voice communication, tele-video communication, "text messaging" such as with Short Message Service (SMS) and/or Multimedia Messaging Service (MMS), and/or any protocol, voice or data that may be transmitted over a cellular network.

According to principles of the present invention, the web server 112 is preferably integrated into the RAM (random access memory) after boot-up of the OS 106, and is thus preferably launched (perhaps from a start-up file) when the OS is started and continues to be operative while the OS is powered up. Accordingly, the web server 112 operates with certainty, without being pre-empted for a long time (e.g., long enough to interrupt a connection with the Internet) or shut-down by the UIF 108 or other applications that may run on the MID 102. Furthermore, the web server 112 is preferably effective for multi-tasking and multi-threading.

In light of the foregoing, it may be appreciated that the MID 102 preferably functions as a conventional "cell phone" that includes additional functionality such as a web server.

In operation, the MID 102 is operative as a cell phone with conventional features such as text messaging, as well as further applications typically found in "smart phones" such as the Apple® iPhone®, Android®, and Blackberry®. Additionally, the MID 102 may also function as an Internet web server by virtue of the web server 112 integrated into the OS 106. Accordingly, a web browser, such as designated by the numeral 114 in the figures, may access the web server 112 via an HTTP Request message 116 transmitted over a communications network such as the Internet 120. In response to the Request, the MID 102 web server 112 responds with an HTTP Response message 118 transmitted over the Internet 120 to the web browser 114. The HTTP Request message 116 may, for example, be generated for any number of reasons, such as by customer support to diagnose and cure a problem with the MID 102, or may be from a friend accessing the web server 112 as a personal web site. By using the web server 112 as a personal web site, a person may enable friends to access or share personal information, without storing such personal information on a third-party web site platform, which could potentially be accessible to the world and not just "friends". Thus, use of the web server 112 as a personal web site could provide significantly increased data security.

Figure 2:
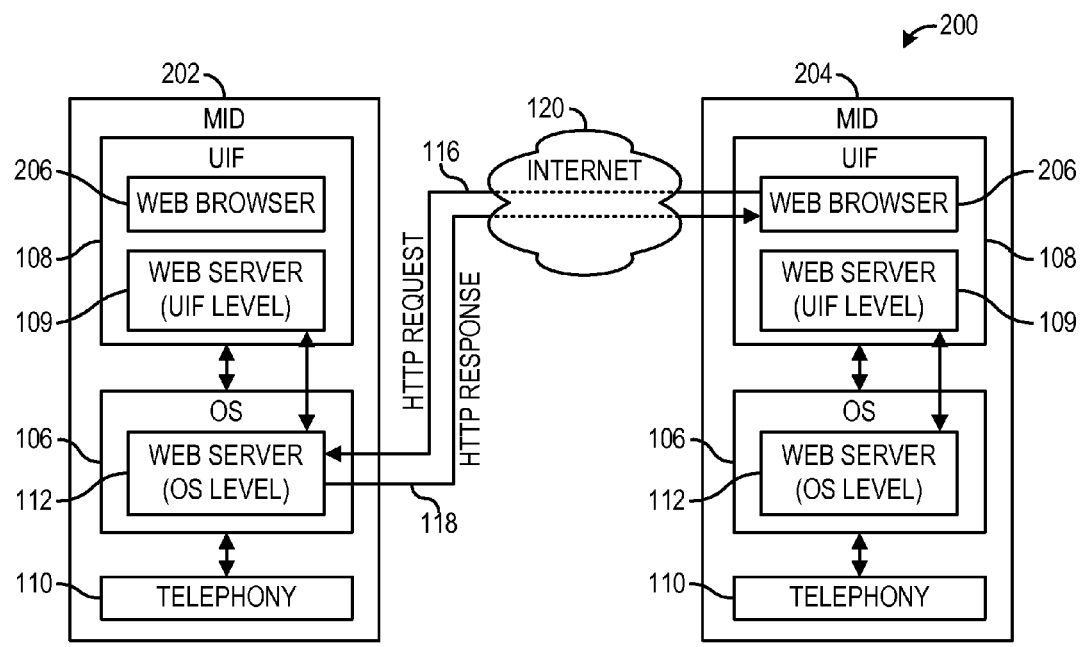
FIG. 2 is a block diagram of two mobile Internet devices in communication with each other in accordance with principles of the present invention.

FIG. 2 exemplifies a further embodiment of the present invention in which two MIDs 202 and 204 are provided similar to the MID 102 of FIG. 1, but for also including in the UIF 108 a web browser 206, generally well-known in the art.

Operation of the MIDs 202 and 204 is exemplified by the web browser 206 of the MID 204 transmitting an HTTP Request 116 across a communications network such as the Internet 120 to the web server 112 of the MID 202. In response, the web server 112 of the MID 202 generates an HTTP Response 118 across the communications network to the web browser 206 of the MID 204.

By configuring two or more MID's with both a web server and a web browser, peer-to-peer (P2P) networking may be implemented between MIDs. More specifically, P2P social networking (e.g., Facebook®) may be implemented. As discussed above, an advantage of web servers that reside on a user's MID is significantly enhanced data security.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A system for running a web server on a mobile Internet device (MID), the system comprising:

at least one MID having an operating system (OS) and a user interface framework (UIF) coupled to the OS, said UIF including at least one object library, said at least one MID being operable at an OS level and at a UIF level, said OS level being distinct from said UIF level;

at least one web server having a first portion and a second portion, said first portion residing within and being operable on said OS at said OS level of a respective one of said at least one MID for servicing HTTP requests, said second portion residing within and being operable on said UIF at said UIF level of a respective one of said at least one MID; and at least one telephony module coupled to the OS, said at least one telephony module having computer program code executable by said at least one OS.

2. The system of claim 1 wherein said at least a first portion of said at least one web server is operable within OS RAM.

3. The system of claim 1 wherein said at least a first portion of said at least one web server is launched automatically when said OS is powered up.

4. The system of claim 1 wherein said at least a first portion of said at least one web server is launched automatically from a startup file when said OS of a respective MID is powered up.

5. The system of claim 1 wherein at least one said web server is operable continually while said OS of a respective MID is powered up.

6. The system of claim 1 where said at least one MID is at least two MID's and said at least a first portion of said at least one web server constitutes at least a first portion of at least two web servers operable on said OS on respective at least two MID's, and said at least two MID's are configured for operating as a peer-to-peer network.

7. The system of claim 1 where said at least one MID is at least two MID's and said at least a first portion of said at least one web server constitutes at least a first portion of at least two web servers operable on said OS on respective at least two MID's, and said at least two MID's are configured for operating as a peer-to-peer social network.

8. The system of claim 1 wherein said at least a first portion of said at least one web server is configured for servicing HTTPS requests.

9. The system of claim 1 wherein said at least a first portion of said at least one web server is configured as a personal web site.

10. The system of claim 1 wherein said at least a first portion of said at least one web server is configured for enabling said at least one MID to receive customer support.

11. The system of claim 1 wherein said at least a first portion of said at least one web server supports multi-tasking.

12. The system of claim 1 wherein said at least a first portion of said at least one web server supports multi-threading.

13. A method for running at least one web server on at least one mobile Internet device (MID), said at least one MID having an operating system (OS) and a user interface framework (UIF), said UIF including at least one object library, said MID's being operable at an OS level and at a UIF level, said OS level being distinct from said UIF level, said method comprising:

operating at least a first portion of said at least one web server within said OS at said OS level of each of said at least one MID's, and operating at least a second portion of said at least one web server within said UIF at said UIF level of each of said at least one MID's;

servicing HTTP requests from said at least a first portion of said at least one web server; and executing computer program code adapted for effectuating telephony functionality.

14. The method of claim 13 further comprising the step of operating said at least a first portion of said at least one web server within a respective OS RAM.

15. The method of claim 13 further comprising the step of launching said at least a first portion of said at least one web server automatically when a respective OS is powered up.

16. The method of claim 13 further comprising the step of launching said at least a first portion of said at least one web server automatically from a startup file when a respective OS is powered up.

17. The method of claim 13 further comprising the step of operating said at least one web server continually while said OS is powered up.

18. The method of claim 13 where said at least one MID is at least two MID's and said at least a first portion of said at least one web server constitutes at least a first portion of at least two web servers operable on said OS on respective at least two MID's; said method further comprising the step of operating said one or more MID's as a peer-to-peer network.

19. The method of claim 13 where said at least one MID is at least two MID's and said at least a first portion of said at least one web server constitutes at least a first portion of at least two web servers operable on said OS on respective at least two MID's; said method further comprising the step of operating said one or more MID's as a peer-to-peer social network.

20. The method of claim 13 further comprising the step of servicing HTTPS requests through said at least one web server.

21. The method of claim 13 further comprising the step of configuring said at least a first portion of said at least one web server as at least one personal web site.

22. The method of claim 13 further comprising the step of receiving through said at least a first portion of said at least one web server customer support for said at least one MID.

23. The method of claim 13 further comprising the step of multi-tasking through said at least one web server.

24. The method of claim 13 further comprising the step of multi-threading through said at least one web server.

25. A system for running a web server on a mobile Internet device (MID), the system comprising:
- at least one MID having an operating system (OS) and a user interface framework (UIF) coupled to the OS, said UIF including object libraries, said at least one MID being operable at an OS level and at a UIF level, said OS level being distinct from said UIF level;
- at least one web server having a first portion and a second portion, said first portion residing within and being operable on said OS at said OS level of a respective one of said at least one MID for servicing HTTP requests, said second portion residing within and being operable on said UIF at said UIF level of a respective one of said at least one MID, said at least one web server being operable continually while said OS of a respective MID is powered up; and
- at least one telephony module coupled to the OS, said at least one telephony module having computer program code executable by said at least one OS.

* * * * *